US012612741B2

(12) United States Patent
Merritt et al.

(10) Patent No.: US 12,612,741 B2
(45) Date of Patent: Apr. 28, 2026

(54) ALIGNMENT APPARATUS

(71) Applicant: Tee-Am, L.L.C., Louisville, KY (US)

(72) Inventors: Kenneth Merritt, Louisville, KY (US); Theresa Monty, Louisville, KY (US)

(73) Assignee: TEE-AM, L.L.C., Louisville, KY (US)

( * ) Notice: Subject to any disclaimer, the term of this patent is extended or adjusted under 35 U.S.C. 154(b) by 341 days.

(21) Appl. No.: 18/444,904

(22) Filed: Feb. 19, 2024

(65) Prior Publication Data

US 2024/0287746 A1      Aug. 29, 2024

Related U.S. Application Data

(60) Provisional application No. 63/447,722, filed on Feb. 23, 2023.

(51) Int. Cl.
*G01B 11/27* (2006.01)
*E01B 35/10* (2006.01)

(52) U.S. Cl.
CPC .............. *E01B 35/10* (2013.01); *G01B 11/27* (2013.01)

(58) Field of Classification Search
CPC ................................. G01B 11/27; E01B 35/10
USPC ...................... 33/1 Q, 286, 523.1, 651, 651.1
See application file for complete search history.

(56) References Cited

U.S. PATENT DOCUMENTS 4,625,412 A * 12/1986 Bradshaw ............ G01B 11/026
                                                              33/651.1
5,036,594 A * 8/1991 Kesler ...................... G01C 9/06
                                                              33/287

5,113,767 A * 5/1992 Theurer .................. E01B 27/20
                                                              104/8
5,199,176 A * 4/1993 Theurer ................... B61K 9/08
                                                              33/651.1
5,584,458 A 12/1996 Rando
5,596,203 A * 1/1997 Zingarelli ............... B61K 9/08
                                                              250/559.38
5,617,645 A * 4/1997 Wick ..................... G01B 11/27
                                                              250/559.23
5,671,540 A 9/1997 Davis
(Continued)

FOREIGN PATENT DOCUMENTS

CN        104568141 A    8/2016
CN        106064774 B    6/2019
(Continued)

OTHER PUBLICATIONS

Pandrol; Rail Equipment Catalogue; Mar. 19, 2020; pp. 1-43; https://www.pandrol.com/wp-content/uploads/2020/03/Rail-Equipment-Catalogue.pdf.
(Continued)

*Primary Examiner* — Peter J Macchiarolo
(74) *Attorney, Agent, or Firm* — Bricker Graydon Wyatt LLP; Max E. Bridges; Matthew A. Williams

(57) ABSTRACT

An alignment apparatus comprising a laser component having a magnet, a pair of guide shoes adapted for mounting to the web portion of a rail, and a pair of lasers. The apparatus further comprising a target component having a magnet, a pair of guide shoes being adapted for mounting to the web portion of a rail, and a target. The pair of lasers project light towards the target component to indicate whether the rails are in alignment. In some embodiments, the laser component comprise a pair of adjustment knobs for calibrating the laser beams.

20 Claims, 7 Drawing Sheets

(56) References Cited

U.S. PATENT DOCUMENTS

| | | | | |
|---|---|---|---|---|
| 6,220,170 | B1 * | 4/2001 | Theurer | E01B 27/16 |
| | | | | 104/10 |
| 6,823,598 | B1 | 11/2004 | Loescher | |
| 7,181,854 | B2 | 2/2007 | Long et al. | |
| 7,499,186 | B2 * | 3/2009 | Waisanen | B66C 9/16 |
| | | | | 356/400 |
| 7,654,006 | B1 | 2/2010 | Mooney | |
| 8,104,186 | B2 * | 1/2012 | Raschella | F41G 1/35 |
| | | | | 42/114 |
| 8,366,065 | B2 | 2/2013 | Kane, Jr. et al. | |
| 8,397,437 | B2 | 3/2013 | Barneman et al. | |
| 9,833,842 | B2 | 12/2017 | Gill | |
| D863,102 | S | 10/2019 | Gill | |
| 11,692,817 | B2 * | 7/2023 | Jozokos | F01D 25/285 |
| | | | | 33/412 |
| 2011/0173822 | A1 * | 7/2011 | Cranton | G01M 11/04 |
| | | | | 356/138 |
| 2022/0136829 | A1 | 5/2022 | Jones | |

FOREIGN PATENT DOCUMENTS

| | | |
|---|---|---|
| CN | 112079229 B | 3/2022 |
| EP | 0619401 A1 | 10/1994 |

OTHER PUBLICATIONS

Maxim; Rail Track Maintenance, Lase-Align MK II: Rail Alignment Gauge, Catalgoue; pp. 1-3; Maxim Power Tools (Scotland) LTD, 2022, http://www.maxim-power.com/railway/maximlasealign.html.

Milkovic, et al., Experimental and Numerical Determination of the Wheel-Rail Angle of Attack, Scientific Paper, Facta Universitatis, Mechanical Engineering vol. 13, No. 2, 2015, pp. 123-131, UDS 629.4, dmilkovic@mas.bg.ac.rs.

Acoem, Vibralign Fixture Laser EVO, 2024, pp. 1-16; https://fixturlaser.com/products/fixturlaser-evo-2/, EVO—Acoem Sweden.

Advanced Test Equipment Rentals, How to use a laser shaft alignment tool using Vibralign Fixturlaser EVO; Sep. 16, 2019; https://www.youtube.com/watch?v=U3wwJOVgvZo, www.atecorp.com, pp. 1-3.

Pinpoint Laser Systems, Microgage PRO—Straightness, Pinpoint Laser System, Fact Sheet, 2024, pp. 1-9, https://pinpointlaser.com/product/pro-straightness/.

Wurtec, Wurtec Laser Alignment Tool Kit, Pew Electrical Distributors, Retail cite, 2010-11, p. 1, https://www.pewelectrical.com/wurtec-lift-products/wurtec-laser-alignment-tool-kit.htm.

Aldon, Spot-Check Laser Gauge (Magnetic), retail cite; 2024, pp. 1-5, https://www.aldonco.com/product/spot-check-laser-gauge/.

Kampczyk, Magnetic-Measuring Square in the Measurement of the Circular Curve of Rail Transport Tracks, Sensors Article 2020, 20, 560; doi:10.3390/s20020560, http://www.mdpi.com/journal/sensors.

Laser Tools Co. Inc., Laser Systems For Crane Industry, retail cite, 2024, pp. 1-3, https://lasertoolsco.com/product/laser-systems-for-crane-industry/.

Pandrol, A-Frame Rail Aligner CR57 and CR61, Fact sheet, 2024, pp. 1-2, https://www.pandrol.com/wp-content/uploads/2022/03/A-Frame-Rail-Aligner-Product-Information-Sheet-EN.pdf.

Railroad Tools and Solutions, Inc., Welder Alignment Plates, Retail cite, 2024, pp. 1-2, https://rrtools.com/product/welders-alignment-plates/.

CRS Metallurgical Machinery Co., Ltd, Rail Alignment Jacks, pp. 1-4, https://www.railweld.com.cn/product-aligner.html, China.

* cited by examiner

30

ALIGNMENT APPARATUS

CROSS-REFERENCE TO RELATED APPLICATIONS

This patent application claims the benefit of and priority to U.S. Provisional Patent Application Ser. No. 63/447,722, with a filing date of Feb. 23, 2023, the contents of which are fully incorporated herein by reference.

FIELD OF INVENTION

The embodiments described herein relate to an apparatus for aligning railroad rails, beams, joists, and similar items with a generally I-shaped cross-section for end-to-end connection (hereinafter collectively referred to as "rails" or "rail" for brevity) or for confirming that a single such rail is straight (i.e. not twisted or otherwise deformed).

BACKGROUND

When rails (or similar items with a generally I-shaped cross-section) are attached end-to-end, need to be fixed, repaired, and/or replaced, they typically must first be aligned. In the non-limiting example of railroad rails, the conventional approach for aligning the rails involves using a straight edge placed on the upper surface of the rails being aligned. However, this conventional approach poses a number of problems and challenges because it is time consuming, cumbersome, and many workers do not have the experience or training to properly use a straight edge. This is a particular problem within the railroad industry, which depends on moving trains quickly and efficiently and any decrease in the number of trains due to a cumbersome repair can be costly and inefficient. In addition, a straight edge must be placed on top of the rails, which poses a significant safety threat if, for example, a train unexpectedly comes down the track while the straight edge is in place.

Accordingly, there is a significant need for an apparatus that is more efficient, practical, user-friendly, and not placed on top of the rails. Along with other features and advantages outlined herein, the alignment apparatus within the scope of present embodiments meet these and other needs.

SUMMARY OF EMBODIMENTS

According to multiple embodiments and alternatives, the alignment apparatus comprises a laser component and a target component. In some embodiments, the laser component comprises a frame, a magnet affixed to the frame and being adapted for attachment to a rail, and a pair of guide shoes, which are adapted for mounting to the web section of a rail. It will be appreciated by one of ordinary skill in the art that the pair of guide shoes are adapted to provide a positive alignment and engagement with the web of the rail to permit the repeatable mounting of the magnet to the rail. A user can select any type of guide shoe as desired that is adapted for mounting in the web section of the particular rail in use and for providing the positive alignment.

The laser component further comprises a pair of lasers that are adjustably mounted on the top and the bottom of the magnet. In some embodiments, the lengths of the pair of lasers are parallel to one another. The frame defines a series of openings to permit the passage of light from the lasers. In further embodiments, the laser component comprises a pair of adjustment knobs which are adapted to move the lasers left or right, and up or down for calibration. A magnet handle is attached to the back of the laser component and mechanically connected to the magnet. In this manner, the magnet's magnetic field can be turned off and on by rotating the magnet handle.

According to multiple embodiments and alternatives, the target component comprises a frame; a magnet, which is mounted to the frame and is adapted for attachment to a rail; a magnet handle, which is mechanically connected to the magnet and can be rotated to turn the magnet off and on; and a pair of interchangeable guide shoes, which (as previously noted with reference to the laser component) are adapted for aligning to the web section of the particular rail and are connected to the frame by a pair of locking knobs. In some embodiments, the outer surface of the sides of the target component each comprise a target (such as a target-line or a pair of cross-hatches as non-limiting examples) for the pair of lasers.

To align two rails, a user (herein the term "user" refers to an individual utilizing the alignment apparatus, e.g. a welder as a non-limiting example) first calibrates the apparatus on a single straight rail (either in or out of the track when used on a railroad line). To calibrate the device, the user places the laser component on the web of the rail and rotates the magnet handle to engage the magnet with the rail. Similarly, the target component is placed adjacent to the laser component in the web of the rail (e.g. 3 to 20 feet away as a non-limiting example), and the magnet handle is rotated to engage the magnet. The user then rotates the laser adjustment knobs to align the lasers with the target. Once the laser and target components are calibrated in this manner (i.e. the lasers are aligned with the target), the components can be removed by rotating the magnet handles and the apparatus is ready to use for aligning, or confirming the alignment of, two rails or for checking the straightness of a single rail.

To align two rails after calibration, the user places the laser component in the web section of the first rail, which has already been installed or is to be installed. The user then rotates the magnet handle to engage the magnet with the rail. Similarly, the target component is placed in the web section of the second rail, and the magnet handle is rotated to engage the magnet. The user turns on the pair of lasers and then adjusts the rails until the pair of lasers are aligned with the target on the target component. Once the laser component and the target component are so aligned (i.e. the lasers are aligned with the target), the user can move into position to perform the necessary repairs, including the non-limiting examples of welding the new rail with the existing rail, or correcting the alignment of the existing rails. Once the work is complete, the user disengages the magnets from the rails by rotating the magnet handles and removes the components.

Compared to conventional methods for aligning rails, the alignment apparatus is more efficient, saves time, is easier to use, is placed in the web section (rather than on top), and provides other features and advantages outlined herein. Furthermore, the alignment apparatus, according to multiple embodiments and alternatives, indicates whether the rails have twisted out of alignment during the repair process.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing Figures described and provided herein are not to scale, and that the embodiments are not limited to the precise arrangements and instrumentalities shown.

MULTIPLE EMBODIMENTS AND ALTERNATIVES

Figure 1:
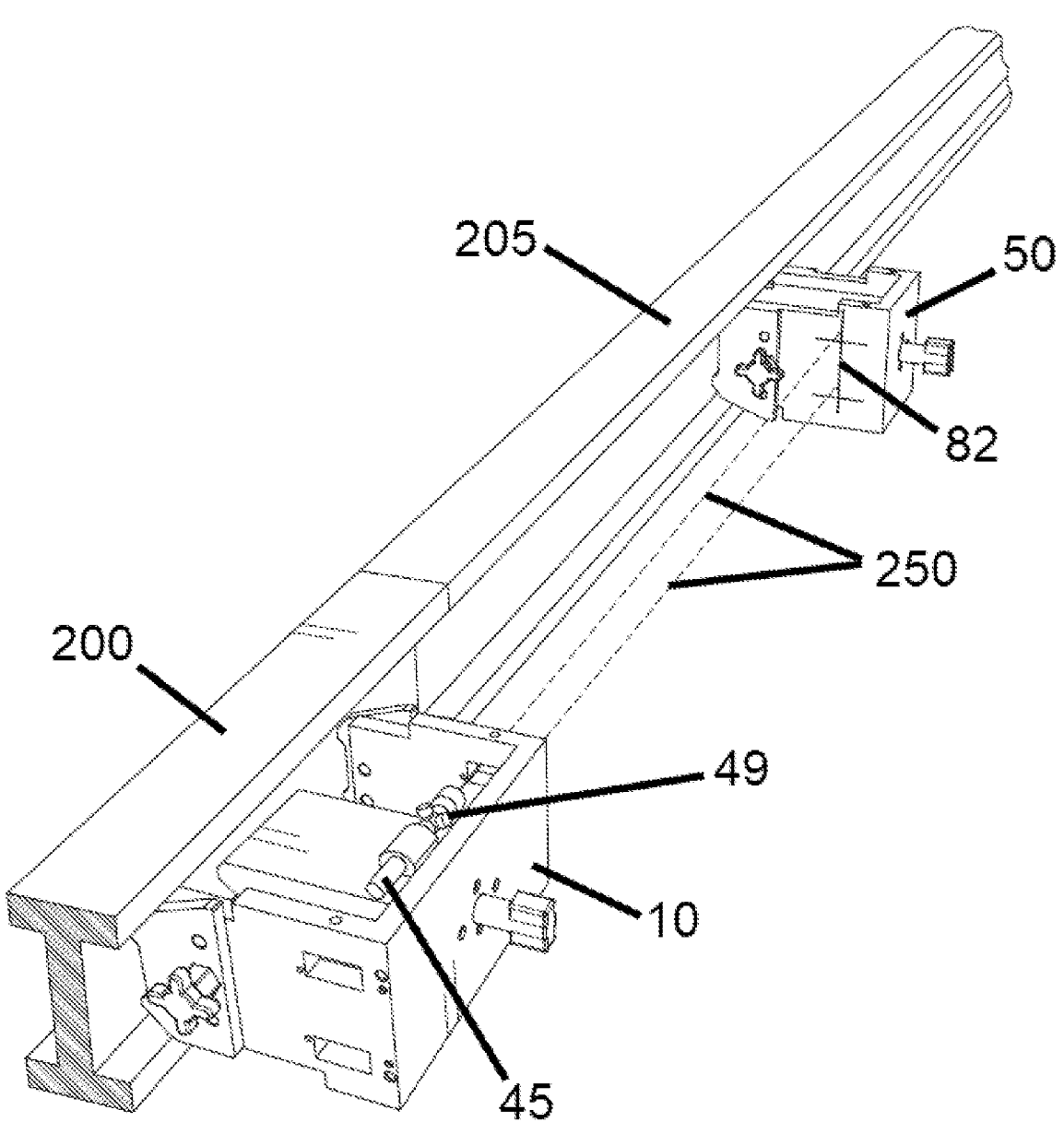
FIG. 1 is a perspective view of an alignment apparatus in which the rails are out of alignment, according to multiple embodiments and alternatives.
Figure 2:
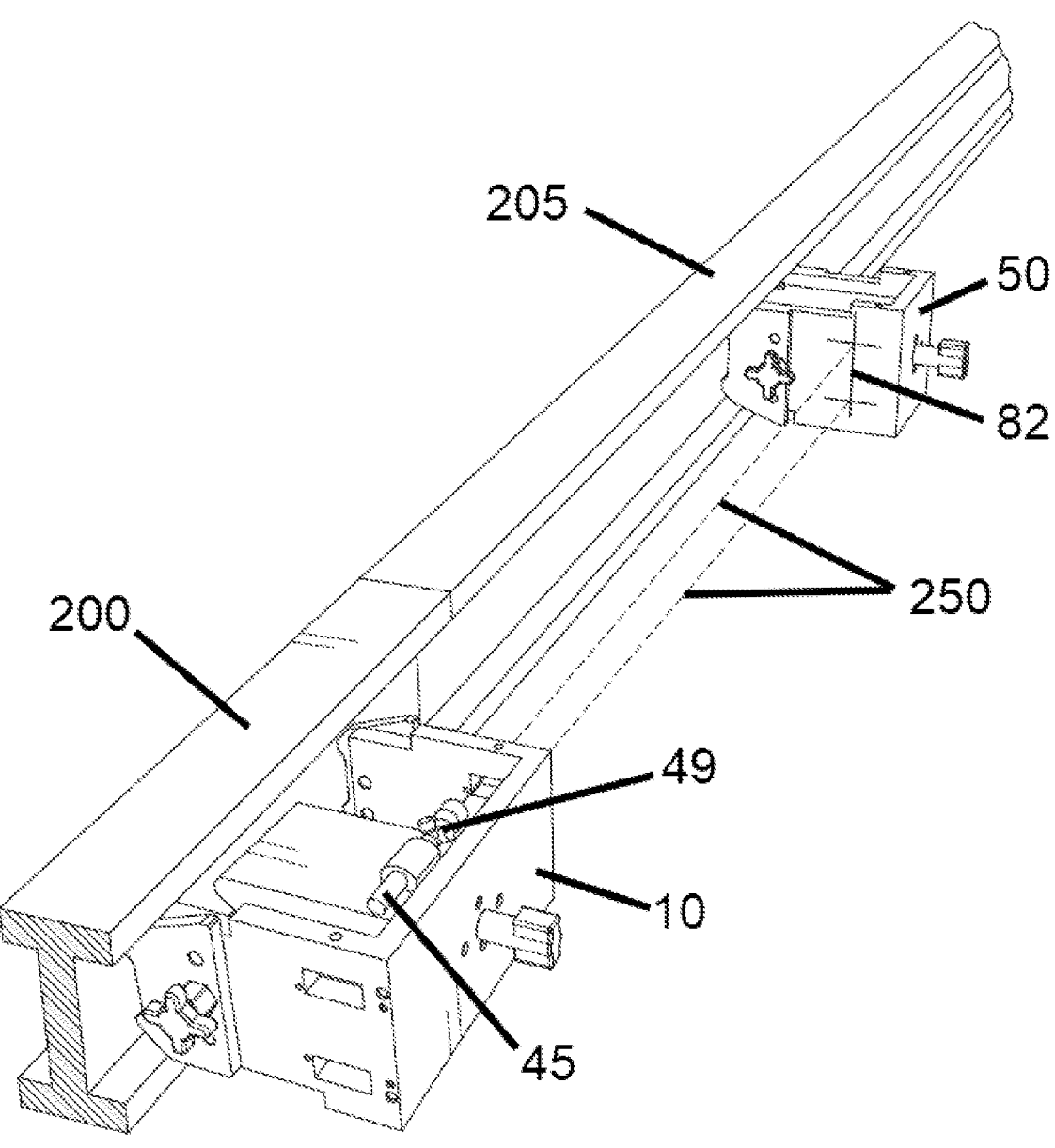
FIG. 2 is a perspective view of an alignment apparatus in which the rails are in alignment, according to multiple embodiments and alternatives.
Figure 3:
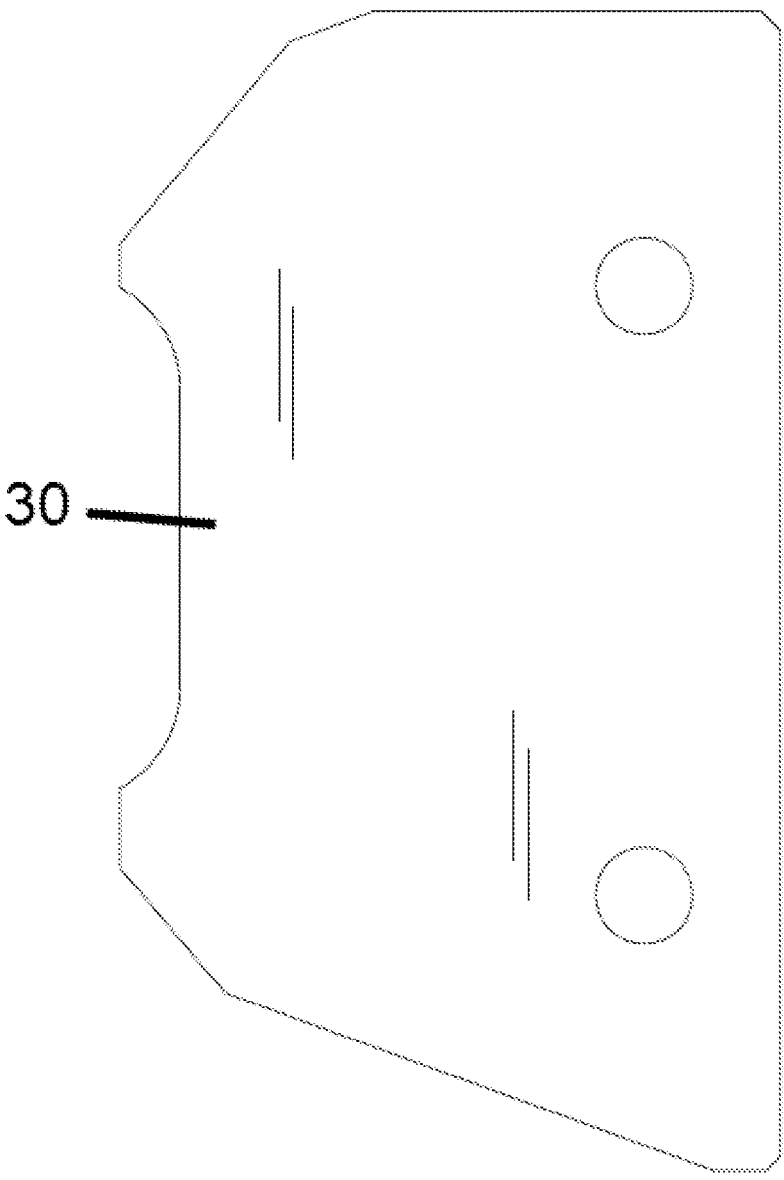
FIG. 3 is a side view of a guide shoe, according to multiple embodiments and alternatives.

FIG. 1 illustrates the alignment apparatus 5 (also referred to herein as the "apparatus" for brevity) mounted in a rail, according to multiple embodiments and alternatives. The apparatus 5 comprises a laser component 10 and a target component 50, both of which are adapted for mounting in the web section of a rail. In some embodiments, the laser component 10 is mounted in the web section of the first rail 200 and the target component 50 is mounted in the web section of the second rail 205. The laser component 10 further comprises a pair of lasers 45 which project light 250 towards the target 82 on the target component 50. As illustrated in FIGS. 1-2, the light 250 from the pair of lasers 45 indicates whether or not the rails 200, 205 are in alignment with one another. For example, when the light 250 is not aligned with the target 82 (as shown in FIG. 1), the rails 200, 205 are out of alignment. However, the rails are in alignment when the light 250 is aligned with the target 82 as shown in FIG. 2 (e.g. by adjusting the rails 200, 205 until they are aligned).

As illustrated in FIGS. 3-7, the laser component 10 comprises a pair of guide shoes 30 and the target component 50 comprises a pair of guide shoes 68. The guide shoes 30, 68 are adapted for mounting in the web section of a rail (which is located between the head and the foot of the rail). It will be appreciated by one of ordinary skill in the art that any type of guide shoes may be utilized as desired in the apparatus 5 for mounting to the web section of the particular rail, including but not limited to, guide shoes adapted for aligning to railroad rails, crane rails, MRS rails, grooved rails, T-Rails and H-Rails, as well as any type of beam such as H-beams, I-beams, w-beams, and similar items with a generally I-shaped cross-section for end-to-end connection. A user can interchange and select the guide shoe to provide a positive alignment with, and engagement to, any type of rail, beam, or joist as desired.

Figure 4:
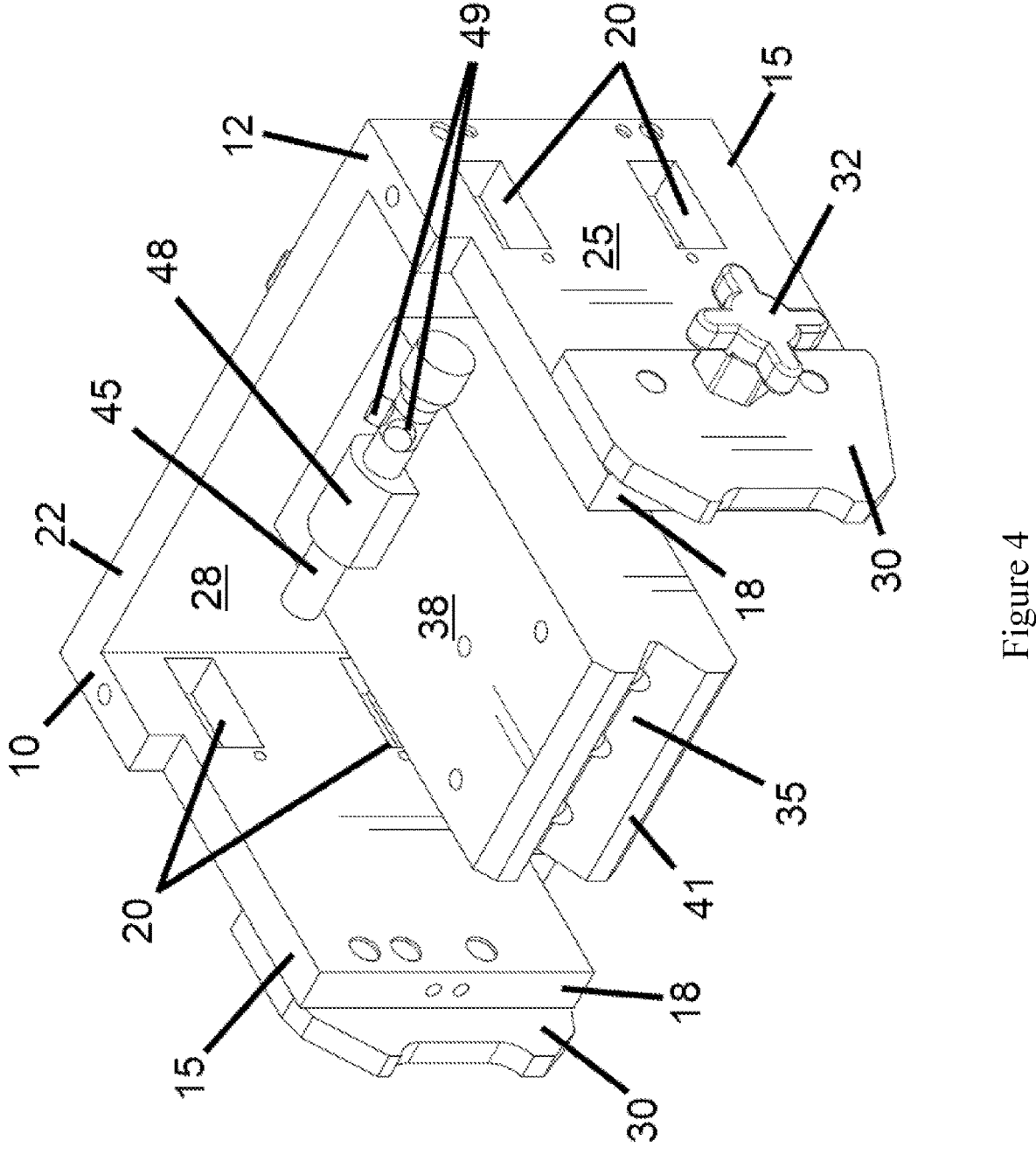
FIG. 4 is a top, perspective view of a laser component of an alignment apparatus, according to multiple embodiments and alternatives.
Figure 5:
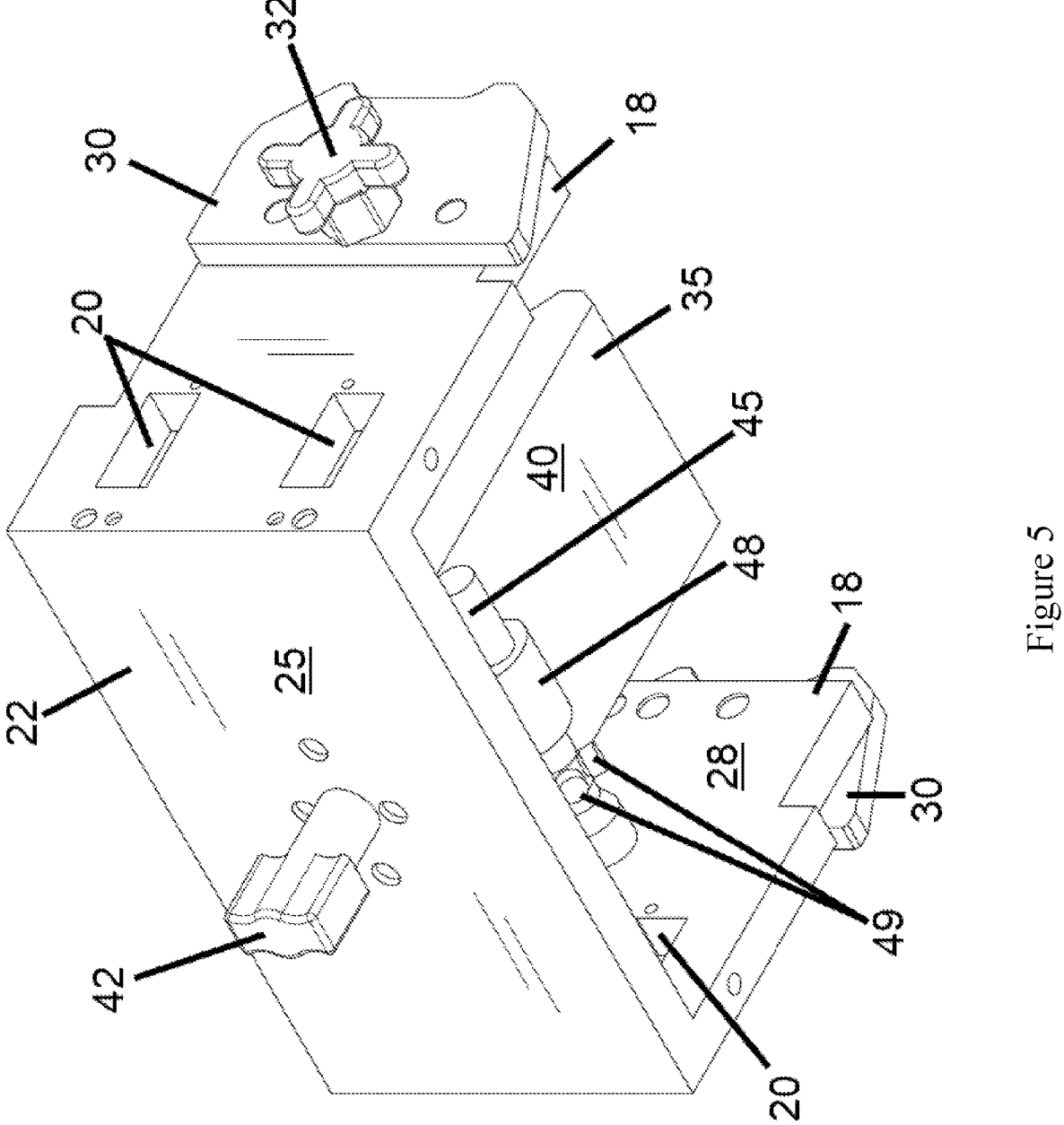
FIG. 5 is a bottom, perspective view of a laser component of an alignment apparatus, according to multiple embodiments and alternatives.

In FIGS. 4-5, the laser component 10 comprises a frame 12 having a long length 22 that is integrally connected to a pair of opposing sides 15. In some embodiments, the pair of opposing sides 15 are connected to the long length 22 at a ninety degree angle, and extend outwards from the long length 22. The pair of opposing sides 15 and the long length 22 define an internal surface 28 and an external surface 25 of the frame 12. The pair of opposing sides 15 further define a series of openings 20 which permit the passage of light from the pair of lasers 45.

The pair of guide shoes 30 are adjustably mounted to the external surface 25 of the ends 18 of the pair of opposing sides 15 by a pair of locking knobs 32. The pair of guide shoes 30 extend outward from the ends 18 of the pair of opposing sides 15 and are adapted for mounting in the web section of a rail.

A rear portion (not numbered) of magnet 35 is mounted to the internal surface 28 of the long length 22. The magnet 35 extends outward from the frame 12 and is positioned between the pair of opposing sides 15. The front portion 41 of the magnet 35 is adapted to connect to a rail. As best illustrated in FIG. 5, a magnet handle 42 is mounted to the external surface 25 of the long length 22 and is mechanically connected to the magnet 35. In some embodiments, a user can turn the magnet 35 off and on by rotating the magnet handle 42.

As shown in FIGS. 4-5, the magnet 35 further defines a top surface 38 and a bottom surface 40. In some embodiments, the pair of lasers 45 are adjustably mounted to the top and bottom surfaces 38, 40 via laser clamps 48 and adjustment knobs 49. By rotating the adjustment knobs 49, a user can move the pair of lasers 45 up or down, as well as right or left, to align the light 250 with the target 82 (e.g. during calibration). According to multiple embodiments and alternatives, the pair of lasers 45 are parallel to each other, and in further embodiments are parallel to the long length 22. In this manner, the lasers 45 project light through the series of openings 20 that are positioned in the pair of opposing sides 15. In some embodiments, the pair of lasers 45 are each positioned the same distance from the long length 22. It will be appreciated that the laser clamps 48 can be loosened by a user, then the pair of lasers 45 can be rotated to project light thru either one of the opposing sides 15, then the lasers 45 can be secured again by tightening the laser clamps 48.

Figure 6:
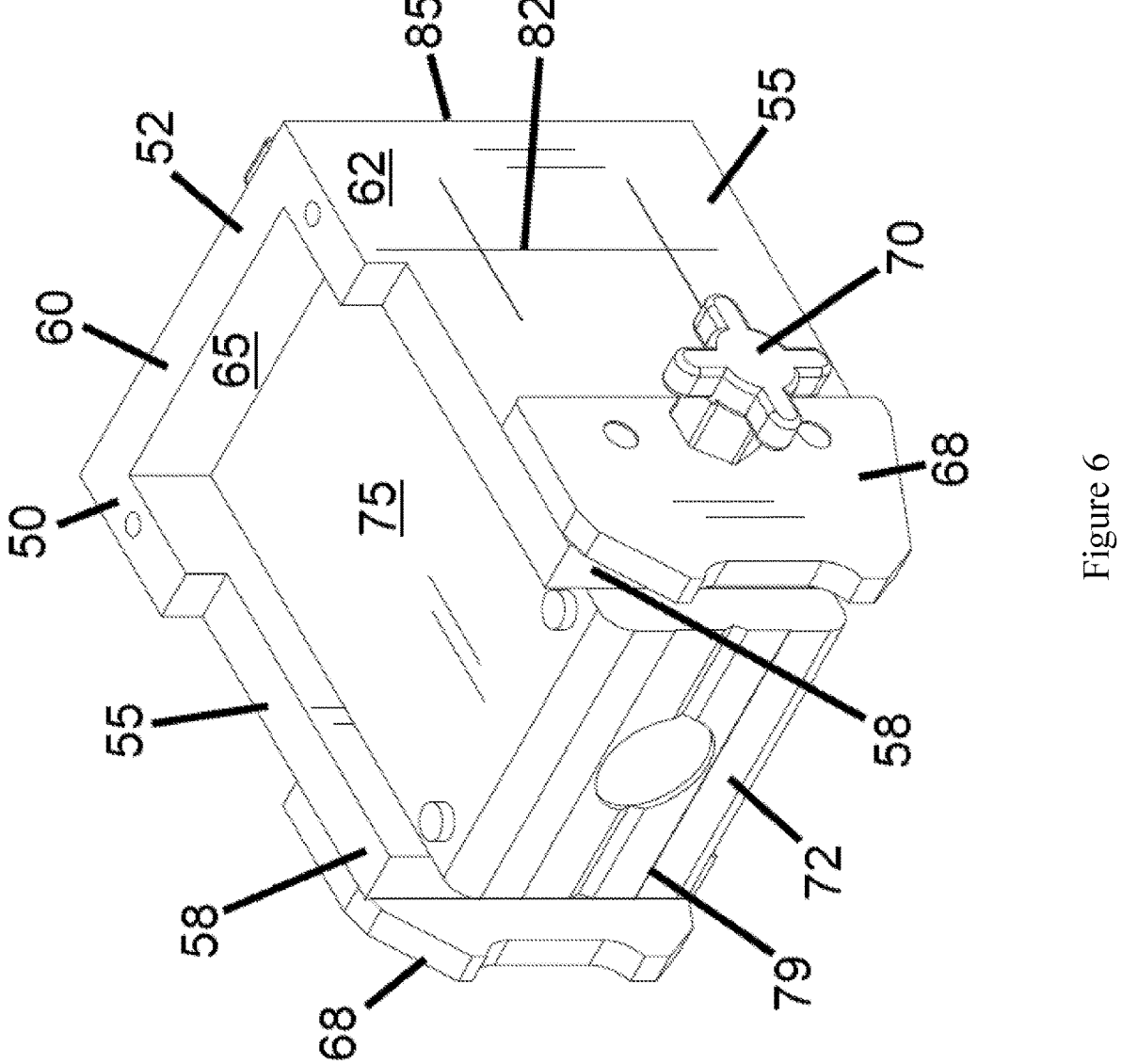
FIG. 6 is a top, perspective view of a target component of an alignment apparatus, according to multiple embodiments and alternatives.
Figure 7:
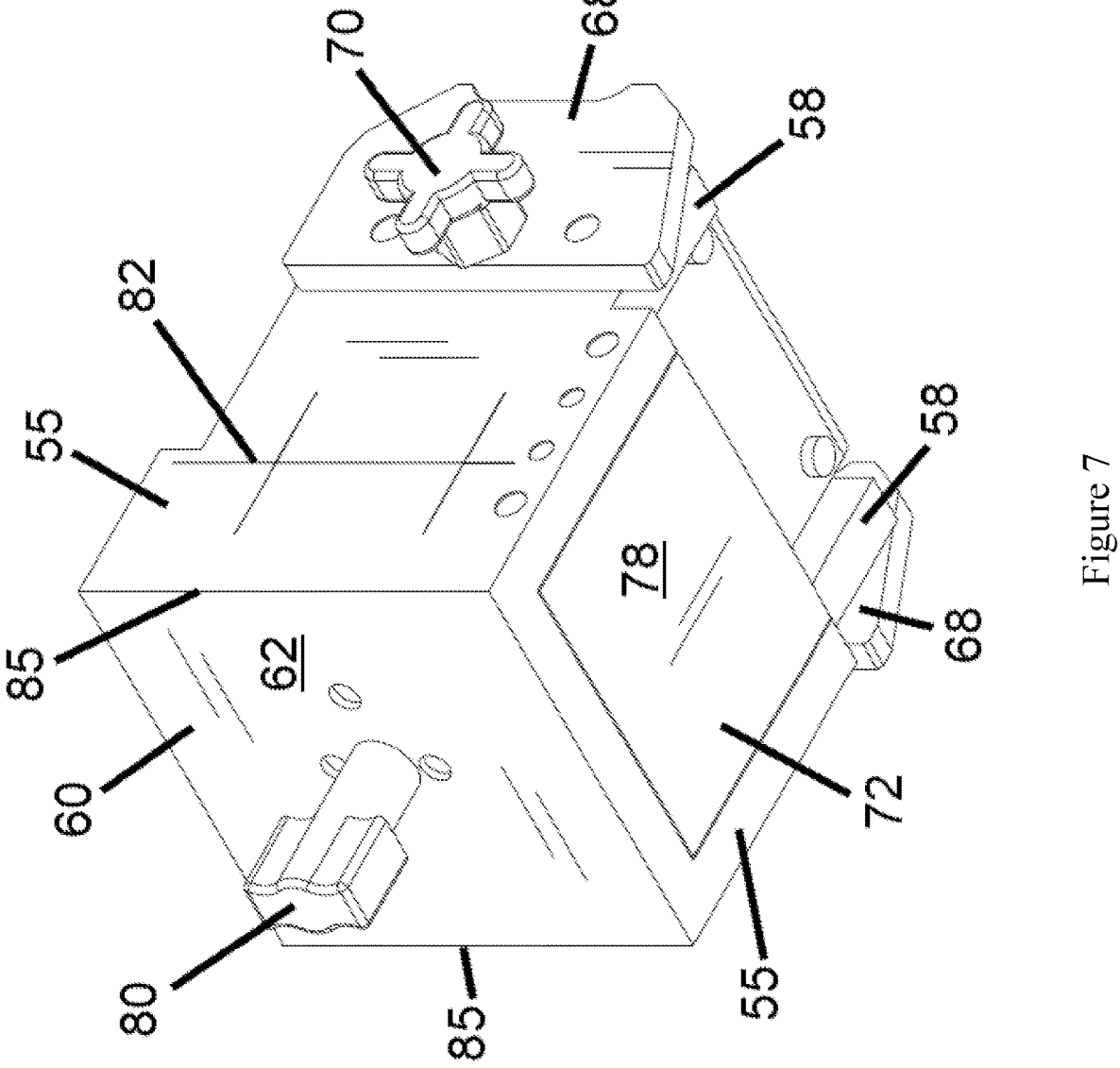
FIG. 7 is a bottom, perspective view of a target component of an alignment apparatus, according to multiple embodiments and alternatives.

In FIGS. 6-7, the target component 50 comprises a frame 52 consisting of a length 60 that is integrally connected to a pair of opposing sides 55. The sides 55 and the length 60 define an internal surface 65 and an external surface 62 of the frame 52. In some embodiments, the pair of opposing sides 55 are connected to the length 60 at a ninety degree angle. A pair of guide shoes 68 are connected to the ends 58 of the pair of opposing sides 55 via locking knobs 70. The pair of guide shoes 68 extend outward from the ends 58 and are adapted for engaging the web section of a rail.

In some embodiments, a target 82 is positioned on the external surface 62 of each of the pair of opposing sides 55 between the pair of guide shoes 68 and the intersection between the sides 55 and the length 60. The target 82 may comprise a line, a pair of cross-hatches, and other shapes and geometries known to one of ordinary skill in the art. A pair of corner edges 85 are defined by the connection between the external surface 62 of the length 60 and the external surface 62 of the pair of opposing sides 55. In some embodiments, a target line(s) is parallel to the pair of corner edges 85.

A magnet 72, having a top surface 75, a bottom surface 78, and a front 79, is mounted to the internal surface 65 of the frame. In some embodiments, the magnet 72 is attached to only the internal surface 65 of the length 60. In further embodiments, the magnet 72 is connected to both the internal surface 65 of the length 60 and the pair opposing sides 55. The front 79 of the magnet 72 is adapted for connecting to the web section of a rail. A magnet handle 80 extends from the external surface 62 of the length 60 and is mechanically connected to the magnet 72. In this manner, a user can turn the magnet 72 off and on by rotating the magnet handle 80.

In operation, a user first calibrates the laser component 10 to the target component 50 by engaging the pair of guide shoes 30 of the laser component 10 with the web section of a rail (e.g. first rail 200). The user then rotates the magnet handle 42 to engage the front 41 of the magnet 35 with first rail 200. Next, the user engages the pair of guide shoes 68 of the target component 50 with the same rail where the laser component is mounted (e.g. first rail 200). In some embodiments, the target component 50 is positioned 3 ft. to 20 ft. away (as a non-limiting example) from the laser component 10 in the same rail. Next, the user then rotates the magnet handle 80 to engage the front 79 of the magnet 72 with the rail 200. The pair of lasers 45 are then turned on and light 250 is projected towards the target 82 on the target component 50. The user rotates the adjustment knobs 49 until the light 250 is aligned with the target 82. In this manner the components 10, 50 are calibrated and the user is ready to align a pair of rails (e.g. to perform the necessary repairs). The user then rotates the magnet handles 42, 80 and removes the laser component 10 and the target component 50 from the single piece of rail (e.g. first rail 200).

Next, the user engages the pair of guide shoes 30 of the laser component 10 in the web section of a rail (e.g. first rail 200). The user then rotates the magnet handle 42 to engage the front 41 of the magnet 35 with first rail 200. Next, the user engages the pair of guide shoes 68 of the target component 50 in the web section of second rail 205. The user then rotates the magnet handle 80 to engage the front 79 of the magnet 72 with the second rail 205. The pair of lasers 45 are then turned on and light 250 is projected towards the target 82 on the target component 50. Then the rails 200, 205 are adjusted by the user until the light 250 is aligned with the target 82 on the target component 50. In this manner, second rail 205 is aligned with first rail 200 and the user can proceed in performing the repair (such as welding rails 200, 205 together as a non-limiting example) with the components 10, 50 engaged to the rails which assists the user in performing the repair and maintaining the alignment during the repair process.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

6

What is claimed is:

1. An alignment apparatus, comprising:
a laser component adapted for mounting in a rail and having a pair of lasers; and
a target component adapted for mounting in said rail and having at least one target;
wherein the pair of lasers project light towards the at least one target to indicate alignment of said rail.

2. The apparatus of claim 1, wherein the laser component further comprises a first pair of guide shoes adapted for engagement with a web section of the rail.

3. The apparatus of claim 2, wherein the laser component further comprises a first magnet adapted to removably engage the web section of the rail.

4. The apparatus of claim 3, wherein the target component comprises a second pair of guide shoes adapted for engagement with a web section of the rail and a second magnet adapted to removably engage the web section of the rail.

5. The apparatus of claim 4, wherein the laser component is further adapted for mounting in the web section of a first rail and the target component is further adapted for mounting in the web section of a second rail;
wherein the pair of lasers project light towards the at least one target to indicate alignment between the first and second rails.

6. The apparatus of claim 3, wherein the pair of lasers comprise a first laser and a second laser, wherein the first laser is adjustably mounted to a top surface of the laser component and the second laser is adjustably mounted to a bottom surface of the laser component.

7. The apparatus of claim 6, wherein each of the pair of lasers is adjustably mounted to the laser component by one or more adjustment knobs, wherein the one or more adjustment knobs are adapted to move each of the pair of lasers horizontally and vertically to align the light from each of said pair of lasers with the at least one target.

8. The apparatus of claim 7, wherein the target component further comprises a frame having a length being integrally connected to a pair of opposing sides;
wherein a target is positioned on an external surface of each of the pair of opposing sides of said target component.

9. The apparatus of claim 8, wherein the laser component further comprises a first magnet handle rotatably attached to an exterior surface of said laser component and being mechanically connected to said first magnet; and
wherein the target component further comprises a second magnet handle rotatably attached to an exterior surface of said frame and said second magnet handle being mechanically connected to said second magnet.

10. An alignment apparatus, comprising:
a laser component having a pair of lasers and a first pair of guide shoes adapted for alignment and engagement with a web section of a first rail; and
a target component having at least one target and a second pair of guide shoes adapted for alignment and engagement with a web section of a second rail;
wherein the pair of lasers project light towards the at least one target to indicate alignment between the first and second rails.

11. The alignment apparatus of claim 10, wherein the laser component further comprises a first magnet positioned between the first pair of guide shoes and being adapted to removably engage the web section of the first rail;

wherein the target component further comprises a second magnet positioned between the second pair of guide shoes and being adapted to removably engage the web section of the second rail.

12. The alignment apparatus of claim 11, wherein the pair of lasers comprise a first laser and a second laser, wherein the first laser is adjustably mounted to a top surface of the first magnet and the second laser is adjustably mounted to a bottom surface of the first magnet.

13. The alignment apparatus of claim 12, wherein each of the pair of lasers is adjustably mounted to the first magnet of the laser component by a laser clamp and one or more adjustment knobs.

14. The alignment apparatus of claim 12, wherein the laser component further comprises a first frame having a long length being integrally connected to a pair of opposing sides at a ninety degree angle, wherein each of the pair of opposing sides extend outwards from a pair of opposing ends of said long length and each of the pair of opposing sides define an end;

wherein the first pair of guide shoes are mounted to the end of said pair of opposing sides;

wherein each of the pair of opposing sides further define a series of openings permitting the passage of light from the pair of lasers thru said pair of opposing sides; and wherein a rear portion of the first magnet is mounted to an internal surface of the long length and a front portion of the first magnet is adapted to removably engage the web section of the first rail.

15. The alignment apparatus of claim 14, wherein the laser component further comprises a first magnet handle rotatably attached to an exterior surface of the long length and being mechanically connected to said first magnet.

16. The alignment apparatus of claim 11, wherein the target component further comprises a second frame having a length being integrally connected to a pair of opposing sides at a ninety degree angle, wherein each of the pair of opposing sides extend outwards from a pair of opposing ends of said length and each of the pair of opposing sides define an end;

wherein the second pair of guide shoes are mounted to the end of said pair of opposing sides;

wherein a target is positioned on an external surface of each of the pair of opposing sides; and wherein a rear portion of the second magnet is mounted to an internal surface of the length and a front portion of the second magnet is adapted to removably engage the web section of the second rail.

17. The alignment apparatus of claim 16, wherein the target component further comprises a second magnet handle rotatably attached to an exterior surface of the length and being mechanically connected to said second magnet.

18. The alignment apparatus of claim 11, wherein the target component is further adapted for mounting in the web section of the first rail;

wherein the pair of lasers project light towards the at least one target to indicate the alignment of said first rail.

19. An alignment apparatus, comprising:

A laser component having a first frame, a pair of lasers, a first magnet, and a first pair of guide shoes adapted for alignment and engagement with a web section of a rail; wherein the first frame comprises a long length integrally connected to a pair of opposing sides, wherein each of the pair of opposing sides extend outwards from a pair of opposing ends of said long length and each of the pair of opposing sides define an end; wherein the first pair of guide shoes are mounted to the end of said pair of opposing sides; wherein a rear portion of the first magnet is mounted to an internal surface of the long length between said first pair of guide shoes and a front portion of the first magnet is adapted to removably engage the web section of said rail; wherein the pair of lasers comprise a first laser and a second laser, wherein the first laser is adjustably mounted to a top surface of the first magnet by one or more adjustment knobs and the second laser is adjustably mounted to a bottom surface of the first magnet by one or more adjustment knobs;

a target component having a second frame, a second magnet, and a second pair of guide shoes adapted for alignment and engagement with a web section of said rail; wherein the second frame comprises a length being integrally connected to a pair of opposing sides, wherein each of the pair of opposing sides extend outwards from a pair of opposing ends of said length and each of the pair of opposing sides define an end; wherein the second pair of guide shoes are mounted to the end of said pair of opposing sides; wherein a target is positioned on an external surface of each of the pair of opposing sides; wherein a rear portion of the second magnet is mounted to an internal surface of the length and a front portion of the second magnet is adapted to removably engage the web section of said rail;

wherein the pair of lasers project light towards the target component and the one or more adjustment knobs are adapted to move each of the pair of lasers horizontally and vertically to align the light from each of said pair of lasers with said target to indicate alignment of said rail.

20. The alignment apparatus of claim 19, wherein the laser component is further adapted for mounting in the web section of a first rail and the target component is further adapted for mounting in the web section of a second rail;

wherein the pair of lasers project light towards the at least one target to indicate alignment between the first and second rails.

* * * * *